(No Model.)

C. W. FOX.
SHAKER FOR MIXING DRINKS.

No. 447,069. Patented Feb. 24, 1891.

Witnesses:
Edward F. Allen
Fred L. Greenleaf

Inventor
Clarence W. Fox
by Crosby Gregory
Attys.

UNITED STATES PATENT OFFICE.

CLARENCE W. FOX, OF SAUGUS, MASSACHUSETTS.

SHAKER FOR MIXING DRINKS.

SPECIFICATION forming part of Letters Patent No. 447,069, dated February 24, 1891.

Application filed June 23, 1890. Serial No. 356,356. (No model.)

*To all whom it may concern:*

Be it known that I, CLARENCE W. FOX, of Saugus, county of Essex, State of Massachusetts, have invented an Improvement in Shakers for Mixing Drinks, of which the following description, in connection with the accompanying drawings, is a specification, like letters on the drawings representing like parts.

This invention has for its object to construct a shaker for mixing drinks.

The essential feature of this invention is the provision of a plate so constructed and arranged that it shall subserve the purpose of an egg-cutter and also a strainer.

In accordance with this invention a cup is designed to fit upon a vessel, which latter may be made of glass or any other suitable material. This cup has at its lower end a cutting or straining plate and at its upper end a small outlet fitted with a suitable closing-cap. When the cup is placed upon the vessel, the cutting and straining plate lies substantially flush with the top of said vessel, thereby presenting the entire capacity of the cup as a receiver for the liquid contents of the vessel when the apparatus is shaken, the tenacious parts of the egg at such time passing back and forth through the said plate. By removing the cap at the top of the cup and overturning the apparatus the liquid contents of the vessel will pass through the plate and out, while the solid matter will be held back in the vessel by means of the said plate.

Figure 1:
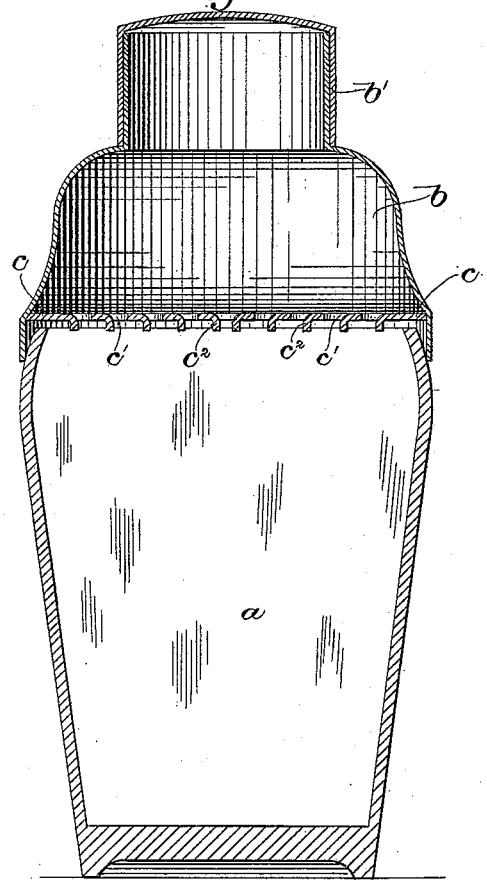
Figure 2:
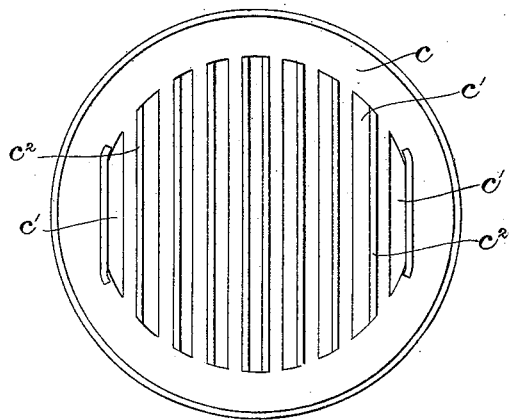

Figure 1 shows in vertical section a shaker embodying this invention; Fig. 2, a plan view of the cutting and straining plate.

The vessel $a$ is made of glass or any other suitable material. The cup $b$ is designed to be fitted snugly upon the vessel $a$. This cup $b$ has at its lower end a plate $c$ fastened to it, it having slits or openings $c'$ formed in it and also having flanges or lips $c^2$. When the cup is placed on the vessel, the plate $c$ lies substantially flush with the top of said vessel, so that the entire cup may serve as a receiver for the liquid contents thereof. The cup $b$ has at its upper end an outlet provided with a closing-cap $b'$. The liquid and solid matter are placed in the vessel $a$ and the cup placed on it, and as the apparatus is shaken the liquid parts will pass through the openings in the plate $c$, while the tenacious parts of the egg are cut by the lips $c^2$. The cap $b'$ is then removed and the liquid contents poured out, while the solid matter is held by the said plate.

I am aware that shakers have been made which contained an egg-cutter, and I am also aware that shakers have been made which contained a strainer; but I am not aware that a shaker has ever been made containing a plate adapted both as an egg-cutter and as a strainer.

I claim—

In a shaker of the kind described, the vessel $a$, the cup $b$, having the cutting and straining plate $c$ attached to it at its lower end and having an outlet at its upper end, and a closing-cap for said outlet, substantially as described.

In testimony whereof I have signed my name to this specification in the presence of two subscribing witnesses.

CLARENCE W. FOX.

Witnesses:
BERNICE J. NOYES,
EMMA J. BENNETT.